United States Patent
Sobel et al.

(10) Patent No.: US 8,214,907 B1
(45) Date of Patent: Jul. 3, 2012

(54) COLLECTION OF CONFIDENTIAL INFORMATION DISSEMINATION STATISTICS

(75) Inventors: William E. Sobel, Jamul, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1165 days.

(21) Appl. No.: 12/036,773

(22) Filed: Feb. 25, 2008

(51) Int. Cl.
*G06F 12/14* (2006.01)

(52) U.S. Cl. .......................................... 726/25

(58) Field of Classification Search .................. None
See application file for complete search history.

(56) References Cited

U.S. PATENT DOCUMENTS

| | | | |
|---|---|---|---|
| 7,802,298 B1* | 9/2010 | Hong et al. | 726/22 |
| 7,865,953 B1* | 1/2011 | Hsieh et al. | 726/22 |
| 8,001,599 B2* | 8/2011 | McBrearty et al. | 726/22 |
| 2006/0123478 A1* | 6/2006 | Rehfuss et al. | 726/22 |
| 2007/0169190 A1* | 7/2007 | Kolton et al. | 726/22 |
| 2008/0256187 A1* | 10/2008 | Kay | 709/206 |
| 2009/0083545 A1* | 3/2009 | Heim et al. | 713/189 |

* cited by examiner

*Primary Examiner* — Kaveh Abrishamkar
(74) *Attorney, Agent, or Firm* — Brill Law Office; Jeffrey Brill

(57) ABSTRACT

Client computers track visited websites and monitor confidential information transmitted to the visited websites. Upon subsequent identification of a website as malicious or compromised, it is determined whether the unsecure website was visited, and if so, whether any confidential information was exposed to the unsecure website. Clients compile statistical reports concerning confidential information transmitted to unsecure websites, and provide these reports to a central server. The central server uses statistical reports received from a wide distribution of clients to maintain comprehensive statistical data indicating exposure of confidential information to unsecure websites. This comprehensive statistical data can be used for purposes such as damage assessment, trend tracking and profiling of suspected malicious websites.

18 Claims, 2 Drawing Sheets

COLLECTION OF CONFIDENTIAL INFORMATION DISSEMINATION STATISTICS

TECHNICAL FIELD

This invention pertains generally to computer security, and more specifically to gathering compromised confidential information for purposes such as damage assessment, trend tracking and profiling of suspected malicious websites.

BACKGROUND

Computer users are often victimized by phishing attacks, in which they unknowingly provide personal and confidential information to malicious websites. Phishing is an attempt to criminally and fraudulently acquire sensitive information, such as usernames, passwords and credit card details, by masquerading as a trustworthy entity in an electronic communication. Phishing attacks are commonly made by sending fraudulent emails or instant messages, and enticing users to click on a link and submit personal information to what appears to be a legitimate website.

Existing anti-phishing solutions use current, real time, data to determine whether a website which is requesting information is trustworthy. This type of information is often not available to these solutions until hours or days after a phishing site goes live. The reason for this delay is that it often takes a period of time for a new phishing site to be discovered, and then for identifying information to be distributed to security software publishers and made available to their users. During this period of time, users may unknowingly expose their personal information to a malicious website without any warnings from their installed anti-phishing solution. Once a phishing site is discovered, new protections are provided to anti-phishing solutions to ensure users are protected until the site is shut down. Once a site is shut down, the work required to build an assessment of the damage caused by the site is typically very time consuming and prone to high error rates. These low quality, slow to market, damage reports lead to inaccurate trending and erroneous views of what data phishing sites are actually targeting.

It would be desirable to be able to create accurate damage reports of what information was actually compromised, for purposes such as damage assessment, trend tracking and profiling of suspected malicious websites.

SUMMARY

Client computers track visited websites and monitor confidential information transmitted to the visited websites. Upon subsequent identification of a website as malicious or compromised, it is determined whether the unsecure website was visited, and if so, whether any confidential information was exposed to the unsecure website. Clients compile statistical reports concerning confidential information transmitted to unsecure websites, and provide these reports to a central server. The central server uses statistical reports received from a wide distribution of clients to maintain comprehensive statistical data indicating exposure of confidential information to unsecure websites. This comprehensive statistical data can be used for purposes such as damage assessment, trend tracking and profiling of suspected malicious websites.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
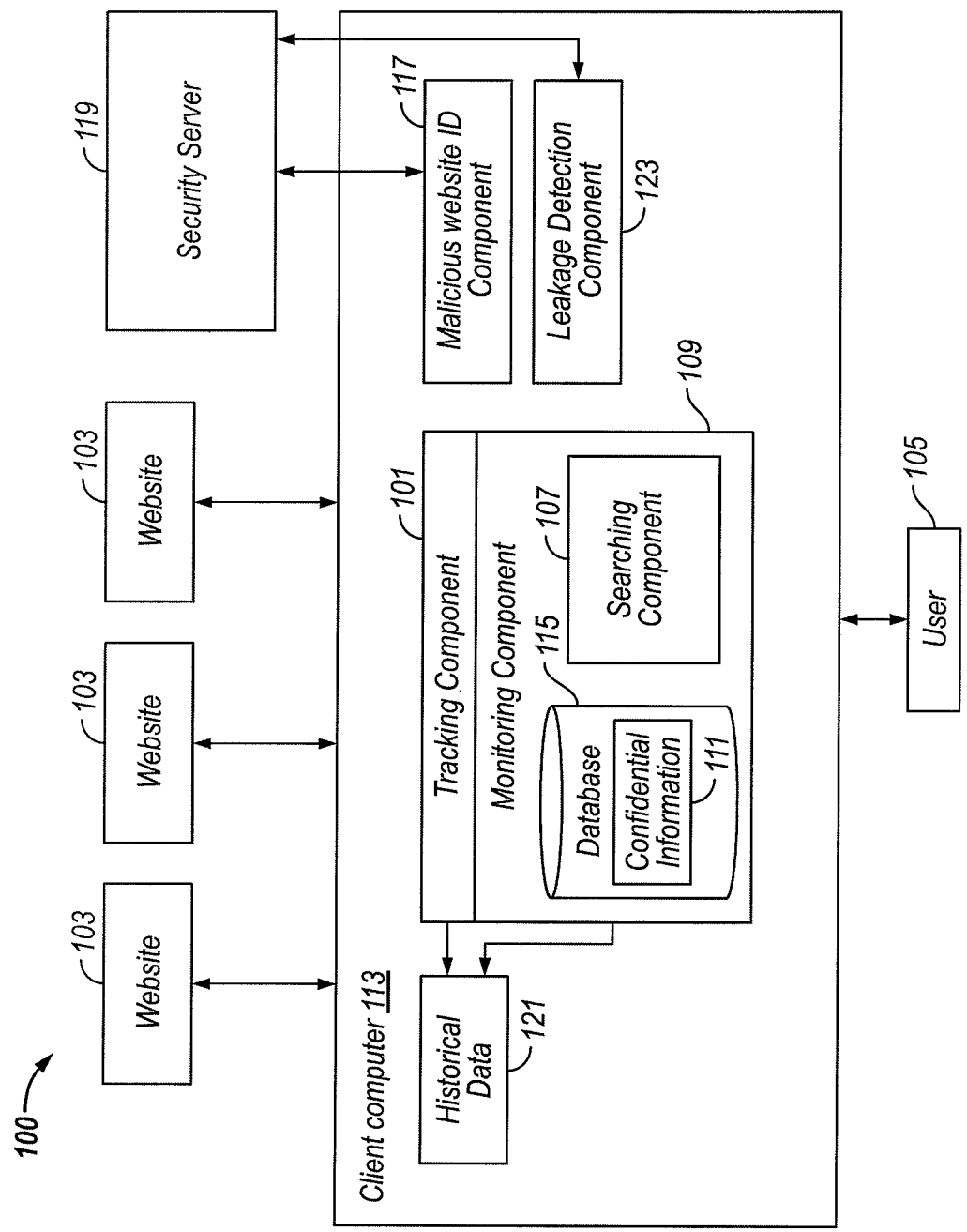
FIG. 1 is a block diagram illustrating a system for a client gathering compromised confidential information, according to some embodiments of the present invention.

FIG. 1 illustrates a system 100 for gathering compromised confidential information 111 for purposes such as damage assessment, trend tracking and profiling of suspected malicious websites 103, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a tracking component 101 tracks websites 103 visited by a user 105. In one embodiment, the tracking component 101 is implemented as a web browser plug-in that is capable to tracking user browsing history. In other embodiments, the tracking component 101 can be implemented in other ways, for example as an HTTP/HTTPS proxy (local or remote, configured or transparent), or as a component that parses a user's web browser history. The implementation mechanics of tracking websites 103 visited by users 105 is within the skill set of those of ordinary skill in the relevant art, and the usage thereof within the context of the present invention will be readily apparent to one of such a skill level in light of this specification.

A monitoring component 109 monitors confidential information 111 leaving the user's computer 113. The monitoring component consists of both a database 115 (or other suitable storage mechanism) for storing the confidential information 111, and a searching component 107 for searching outbound network traffic for occurrences of this confidential data 111. In one embodiment, the searching component 107 is implemented as a web browser plug-in, but it can also be implemented in other ways, such as a HTTP/HTTPS proxy (local or remote, configured or transparent). The monitoring component 109 works in conjunction with the tracking component 101 to maintain an accurate history 121 of what sites 103 were visited and what confidential information 111 was transmitted to each visited site 103.

The implementation mechanics of storing confidential information 111 and searching outbound network traffic for confidential information 111 are within the skill set of those of ordinary skill in the relevant art, and the usage thereof within the context of the present invention will be readily apparent to one of such a skill level in light of this specification. It is to be understood that what information is considered to be confidential is a variable design parameter. In different embodiments, specific data and types of information can be classified as confidential by users 105, system administrators, publishers of security software and/or other parties as desired.

In some embodiments, a malicious website identification component 117 proactively identifies websites 103 that are malicious. Many varied techniques for identifying malicious websites 103 are well known, and any of them can be utilized in this context. For example, this can be done via automated heuristic analysis, where the heuristics consist of factors such as geo-location, how long the site has been active, how quickly the site went away, the use of known trademarks of other entities, overly financially/personally inquisitive forms, hosting company, use of known browser exploits, and many other features. Malicious websites 103 can also be identified by human review, or by receipt of indications 118 of identified malicious websites 103, for example from a central computer security server 119. In any case, when the malicious website identification component 117 identifies a malicious website 103, the historical data 121 is checked to determine whether the identified malicious website 103 has been visited, and if so, what confidential information 111 has been exposed to be malicious website 103. This process is discussed in greater detail below in conjunction with FIG. 2.

In some embodiments, a leakage detection component 123 identifies unintentional leaks of confidential information 111 from "good" or "trusted" websites 103. This component 123 can be implemented as a service allowing these good/trusted sites 103 to submit information leakage disclosures, for example to a central computer security website 119, which in turn could provide them to leakage detection components 123 installed on multiple client sites 113 (e.g., user's computers). The leakage detection component 123 can also be implemented to receive leakage data entered from a manual process, in which, for example, one or more people monitor for press releases or disclosure statements concerning information leaks from good/trusted sites 103. As with the identification of malicious websites 113, the historical data 121 is checked to determine whether the trusted website 113 from which confidential information 111 has leaked has been visited, and if so, what confidential information 111 has been exposed to the compromised website 113.

Figure 2:
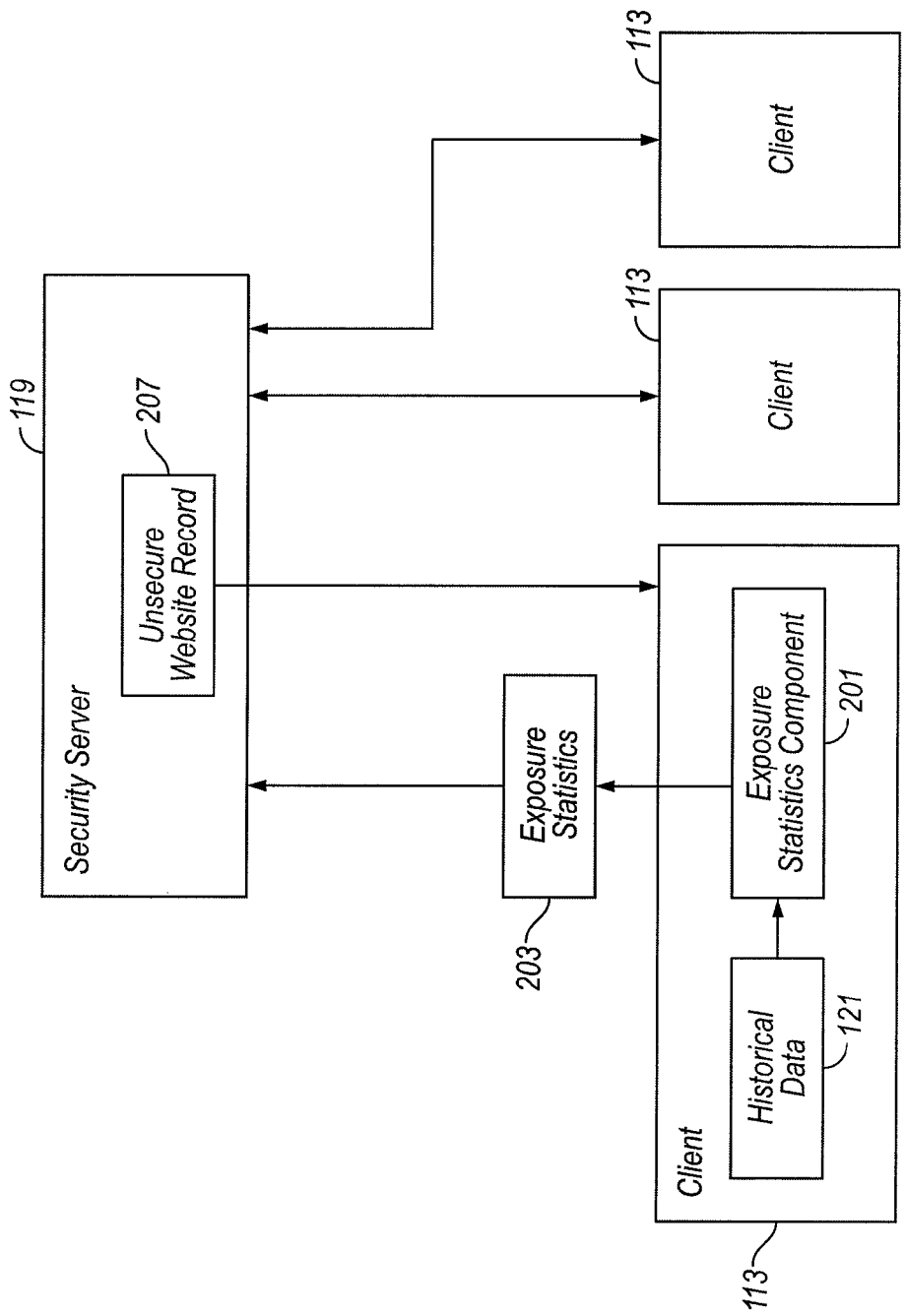
FIG. 2 is a block diagram illustrating a system for a server gathering compromised confidential information, according to some embodiments of the present invention.

Turning now to FIG. 2, the collected history 121 detailing which sites 103 were visited and what confidential information 111 was exposed to these sites 103 can be used to compile accurate exposure statistics 203, once it is determined that a given site 103 is malicious or compromised. As illustrated, an exposure statistics component 201 uses this history data 121 to produce accurate statistical reports 203 concerning exposure of confidential information 111 from the user's computer 113 to websites 103 determined to be malicious or compromised.

In one embodiment, a central computer security server 119 maintains a record 207 of websites 103 recently discovered to be malicious or compromised, and makes this listing 207 available to clients 113. Under this embodiment, client computers 113 retrieve or otherwise receive this list 207 from the server 119 according to a defined interval (e.g., once a day, twice a day, upon significant update, etc.) For each new site 103 in the list 207, the exposure statistics component 201 compiles exposure statistics 203 based upon the history 121, and submits the statistics 203 back to the server 119. To maintain user privacy, the statistics 203 returned to the server 119 can be kept anonymous. For example, the statistic report 203 can omit user identifying data, and include only a general summary of the exposed confidential information 111, such as "3 VISA numbers, 1 pin number, 1 AMEX number, 1 social security number, 1 name, 1 address, 2 phone numbers, 1 DOB." In another embodiment, to collect exposure statistics 203 for a given malicious website 103, the server 207 queries individual clients 113 for exposure counts for a given URL 103.

Although the exposure statistics component 201 is illustrated as running on the client 113 and transmitting complied statistics 203 to the server 119, it is to be understood that in some embodiments, clients 113 can submit raw exposure data to the server 119, which in turn performs statistical compilation. Whether the statistical compilation is performed by clients 113 or a server 119, or distributed between such computing devices in any combination is a variable design choice.

As discussed above in conjunction with FIG. 1, in some embodiments a malicious website identification component 117 proactively identifies malicious websites 103, responsive to which the exposure statistics component 201 can produce accurate statistical reports 203 (or raw data) concerning any exposure of confidential information 111 to the site 103 in question. Additionally, the exposure statistics component 201 can produce statistical reports 203 (or raw data) concerning any possible exposures of confidential information 111 resulting from leakage from trusted sites 113, responsive to discovery of such information leakage by the leakage detection component 123, or otherwise.

By receiving statistical reports 203 (or raw data) from a large number of clients 113, the security server 119 can maintain timely and comprehensive statistical data 203 indicating the level and nature of exposure to various discovered malicious websites 103 and compromised trusted websites 103. With wide client 113 distribution, an investigator (e.g., computer security professional) could have a fairly complete picture of end user exposure resulting from any given phishing attack or site 103 compromise shortly after discovery (e.g., within 24 hours.) These statistics 203 could then be used to paint a more realistic picture of actual damage caused by any given attack, or could be aggregated to provide a better view of the overall phishing arena and what information is most likely at risk. Further, these aggregate statistics 203 can be used to fine tune identification of malicious websites 103 via heuristic analysis and the like, for example by a malicious website identification component 117 or otherwise.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for gathering statistics concerning compromised confidential information, the method comprising the steps of:
    tracking websites visited by at least one user of a computing device;
    monitoring confidential information transmitted from the computing device;
    determining that at least one website is unsecure;
    responsive to determining that the at least one website is unsecure, determining whether confidential information was transmitted to the at least one unsecure website from the computing device;
    creating at least one statistical report concerning confidential information transmitted to at least one unsecure website; and
    transmitting at least one created statistical report to a remote computing device.

2. The method of claim 1 wherein monitoring confidential information transmitted from the computing device further comprises:
    storing a set of data considered to be confidential; and
    searching outbound network traffic for occurrences of data of the set.

3. The method of claim 1 wherein determining that at least one website is unsecure further comprises performing a step from a group of steps consisting of:
    determining that at least one website is malicious; and
    determining that at least one trusted website has leaked confidential information.

4. The method of claim 1 wherein determining that at least one website is unsecure further comprises:
    performing heuristic analysis on at least one website; and
    responsive to the heuristic analysis, determining that at least one website is malicious.

5. The method of claim 1 wherein determining that at least one website is unsecure further comprises:
    receiving at least one indication from at least one external source that at least one website is unsecure.

6. The method of claim 1 further comprising:
    transmitting data concerning confidential information transmitted to at least one unsecure website to a remote computing device.

7. A computer implemented method for gathering statistics concerning compromised confidential information, the method comprising the steps of:
    maintaining a current record of websites determined to be insecure;
    periodically transmitting the record to a plurality of client computers;
    determining whether confidential information was transmitted to at least one unsecure website by a client computer;
    receiving, from client computers of the plurality, statistical reports concerning confidential information transmitted to unsecure websites; and
    maintaining, in a security server, comprehensive statistical data indicating exposure of confidential information to unsecure websites.

8. The method of claim 7 wherein each unsecure website further comprises one from a group consisting of:
    a malicious website; and
    a trusted website that has leaked confidential information.

9. The method of claim 7 further comprising:
    receiving a request for statistical data concerning exposure of confidential information to at least one unsecure website; and
    transmitting said statistical data to a requesting party.

10. The method of claim 7 further comprising:
    querying at least one client computer for data concerning confidential information transmitted to at least one unsecure website.

11. At least one non-transitory computer readable medium containing a computer program product for gathering statistics concerning compromised confidential information, the computer program product comprising:
    program code for tracking websites visited by at least one user of a computing device;
    program code for monitoring confidential information transmitted from the computing device;
    program code for determining that at least one website is unsecure;
    program code for responsive to determining that the at least one website is unsecure, determining whether confidential information was transmitted to the at least one unsecure website from the computing device; and
    program code for assembling data concerning confidential information transmitted to at least one unsecure website;
    program code for creating a statistical report concerning confidential information transmitted to at least one unsecure website; and
    program code for transmitting at least one created statistical report to a remote computing device.

12. The computer program product of claim 11 wherein the program code for monitoring confidential information transmitted from the computing device further comprises:
    program code for storing a set of data considered to be confidential; and
    program code for searching outbound network traffic for occurrences of data of the set.

13. The computer program product of claim 11 wherein the program code for determining that at least one website is unsecure further comprises program code for performing a step from a group of steps consisting of:
    determining that at least one website is malicious; and
    determining that at least one trusted website has leaked confidential information.

14. The computer program product of claim 11 wherein the program code for determining that at least one website is unsecure further comprises:
    program code for performing heuristic analysis on at least one website; and
    program code for, responsive to the heuristic analysis, determining that at least one website is malicious.

15. The computer program product of claim 11 wherein the program code for determining that at least one website is unsecure further comprises:

program code for receiving at least one indication from at least one external source that at least one website is unsecure.

16. The computer program product of claim 11 further comprising:

program code for transmitting data concerning confidential information transmitted to at least one unsecure website to a remote computing device.

17. At least one non-transitory computer readable medium containing a computer program product for gathering statistics concerning compromised confidential information, the computer program product comprising:

program code for maintaining a current record of websites determined to be insecure;

program code for periodically transmitting the record to a plurality of client computers;

program code for receiving, from client computers of the plurality, data concerning confidential information transmitted to unsecure websites;

program code for maintaining comprehensive statistical data indicating exposure of confidential information to unsecure websites;

program code for receiving a request for statistical data concerning exposure of confidential information to at least one unsecure website;

program code for transmitting said statistical data to a requesting party; and program code for querying at least one client computer for data concerning confidential information transmitted to at least one unsecure website.

18. The computer program product of claim 17 wherein each unsecure website further comprises one from a group consisting of:

a malicious website; and a trusted website that has leaked confidential information.

* * * * *